US012650013B2

(12) United States Patent
Olson

(10) Patent No.: US 12,650,013 B2
(45) Date of Patent: Jun. 9, 2026

(54) INTEGRATED BACKER FOR GLAZING SYSTEMS

(71) Applicant: Lawrence T Olson, Aurora, CO (US)

(72) Inventor: Lawrence T Olson, Aurora, CO (US)

(*) Notice: Subject to any disclaimer, the term of this patent is extended or adjusted under 35 U.S.C. 154(b) by 0 days.

(21) Appl. No.: 19/344,355

(22) Filed: Sep. 29, 2025

(65) Prior Publication Data

US 2026/0092443 A1 Apr. 2, 2026

Related U.S. Application Data

(60) Provisional application No. 63/700,129, filed on Sep. 27, 2024.

(51) Int. Cl.
*E04B 1/76* (2006.01)
*E04B 1/80* (2006.01)
*E06B 3/673* (2006.01)

(52) U.S. Cl.
CPC .............. *E04B 1/7604* (2013.01); *E04B 1/80* (2013.01); *E06B 3/673* (2013.01)

(58) Field of Classification Search
CPC .......... E04B 1/7604; E04B 1/80; E06B 1/325; E06B 1/366; E06B 1/38; E06B 1/524; E06B 1/56; E06B 1/6084; E06B 3/267; E06B 3/304; E06B 3/66314; E06B 3/725
USPC .................................. 52/204.5, 204.71, 214
See application file for complete search history.

(56) References Cited

U.S. PATENT DOCUMENTS 3,204,324 A * 9/1965 Nilsen ..................... E06B 3/267 52/309.3
3,422,876 A * 1/1969 Fester .................... B60H 1/267 160/90
3,512,304 A * 5/1970 Meuret ..................... E06B 3/74 52/456
3,786,609 A * 1/1974 Difazio ................... E06B 3/825 52/794.1
3,823,524 A * 7/1974 Weinstein ............... E06B 3/267 264/261
3,885,351 A * 5/1975 Imperial ............... E06B 7/2316 49/470
3,987,588 A * 10/1976 Imperial ................... E06B 3/88 49/501
3,992,769 A * 11/1976 Jackson .................. B23P 11/00 29/418
3,995,405 A * 12/1976 Peterson ................. E06B 3/585 52/800.15
4,018,022 A * 4/1977 Fink .................... E06B 3/26336 52/204.593
4,096,665 A * 6/1978 Ellingson, Jr. ............ E06B 3/44 49/495.1
4,113,905 A * 9/1978 Kessler ............... E06B 3/66314 52/786.13
4,204,373 A * 5/1980 Davidson .................. E06B 1/64 52/127.7
4,342,144 A * 8/1982 Doguchi ................. E06B 3/267 52/843

(Continued)

*Primary Examiner* — James M Ference
(74) *Attorney, Agent, or Firm* — Leyendecker & Lemire, LLC

(57) ABSTRACT

Embodiments of an integrated backer include an insulating member configured to mate with an extrusion for a glazing system. The insulating member can provide insulation and a uniform backer for sealant application to the glazing system such that sealant can be applied to an exterior and an interior of the glazing system simultaneous or one after the other without having to have one cure first.

20 Claims, 7 Drawing Sheets

(56) References Cited

U.S. PATENT DOCUMENTS 4,720,951 A * 1/1988 Thorn ..................... E06B 3/221 D25/119
4,953,334 A * 9/1990 Dickens .................. E04F 17/08 52/468
5,077,948 A * 1/1992 Olson ................. B29C 65/5042 49/478.1
5,187,867 A * 2/1993 Rawlings ................ E06B 3/267 29/418
5,209,036 A * 5/1993 Cancilliari ............ E04B 1/2604 52/309.4
5,239,799 A * 8/1993 Bies .......................... E06B 3/78 52/309.11
5,313,762 A * 5/1994 Guillemet ............... B29C 48/15 52/786.13
5,551,189 A * 9/1996 Westfall .................. E05D 15/22 49/419
5,557,899 A * 9/1996 Dube ...................... E06B 3/725 52/204.593
5,630,306 A * 5/1997 Wylie ................. E06B 3/67304 29/897.3
6,125,608 A * 10/2000 Charlson ................. F16B 33/02 52/847
6,619,005 B1 * 9/2003 Chen ..................... E06B 3/5892 52/800.1
7,827,760 B2 * 11/2010 Brunnhofer ......... E06B 3/66319 52/786.13
9,371,646 B2 * 6/2016 Magoon .................. E04B 2/967
11,761,258 B1 * 9/2023 Klein ........................ E06B 3/66 52/204.5
2003/0145542 A1 * 8/2003 Chen ....................... E06B 3/825 52/784.1
2007/0095010 A1 * 5/2007 Amend ..................... E04B 1/80 52/745.19
2007/0227086 A1 * 10/2007 Beavers .................... E04B 1/80 52/309.7
2018/0135346 A1 * 5/2018 Warren ..................... E06B 1/38
2022/0010611 A1 * 1/2022 Rietz ..................... E06B 3/6621
2022/0389749 A1 * 12/2022 Glover ................ E06B 3/26301

* cited by examiner

INTEGRATED BACKER FOR GLAZING SYSTEMS

CROSS-REFERENCE TO RELATED APPLICATION

This application claims the benefit of U.S. Provisional Application No. 63/700,129, filed Sep. 27, 2024.

BACKGROUND

Storefront and commercial building glazing systems are types of glass installation used primarily in commercial buildings, such as retail stores, offices, and other public spaces. They typically involve large glass panels that are framed and installed in an exterior wall opening and are typically configured to provide visibility, natural light, and a modern aesthetic.

The glazing system is typically comprised of vertical and horizontally-orientated extrusions (mullions and transoms respectively) that anchor the system within a building opening and provide support for the resident glass panel(s) along the panel's respective edges. The extrusions (typically the mullions) can abut the edge of a building opening or two mullions can abut each as a break between two adjacent panels. The glass panels are received and in the inside surfaces of the framing extrusions and typically held in place with an adhesive sealant, such as a silicone sealant.

An extrusion can be used to enclose the open back end of the glazing system and seal the window system against an adjacent wall. The left side of the extrusions form a channel in which a window panel is received. The open right side is typically covered with a plastic filler. The plastic filler is used to keep a round backer rod from falling into the open extrusion cavity. When the extrusion is butted against the edge of a building opening (i.e. edge of a wall), it is desirable to close the open side. Typically, this is done by securing an elongated plastic filler across the opening, which snaps in place. One or two foam rods are pressed into the gap between the edge of the building opening and the plastic filler closed edge of the extrusion. The foam rod (or gap sealer rod) is typically set back from the edge of the extrusions about 0.5", and it serves as a backing for a bead of caulk that is applied over it. It is common to use another rod set back from the opposite edge of the extrusions as well for the same purpose. If the gap between the edge of the opening and the extrusion is too great, the foam rod may slide in too deep often pushed inwardly while the caulk is being applied requiring a greater amount of caulk to be used to fill the larger gap. Furthermore, can be difficult to install the rod along its length at a uniform depth, requiring more caulk in some places and less in others. These issues can increase both the time of installation and the cost of caulk required for a job.

DETAILED DESCRIPTION

Figure 1:
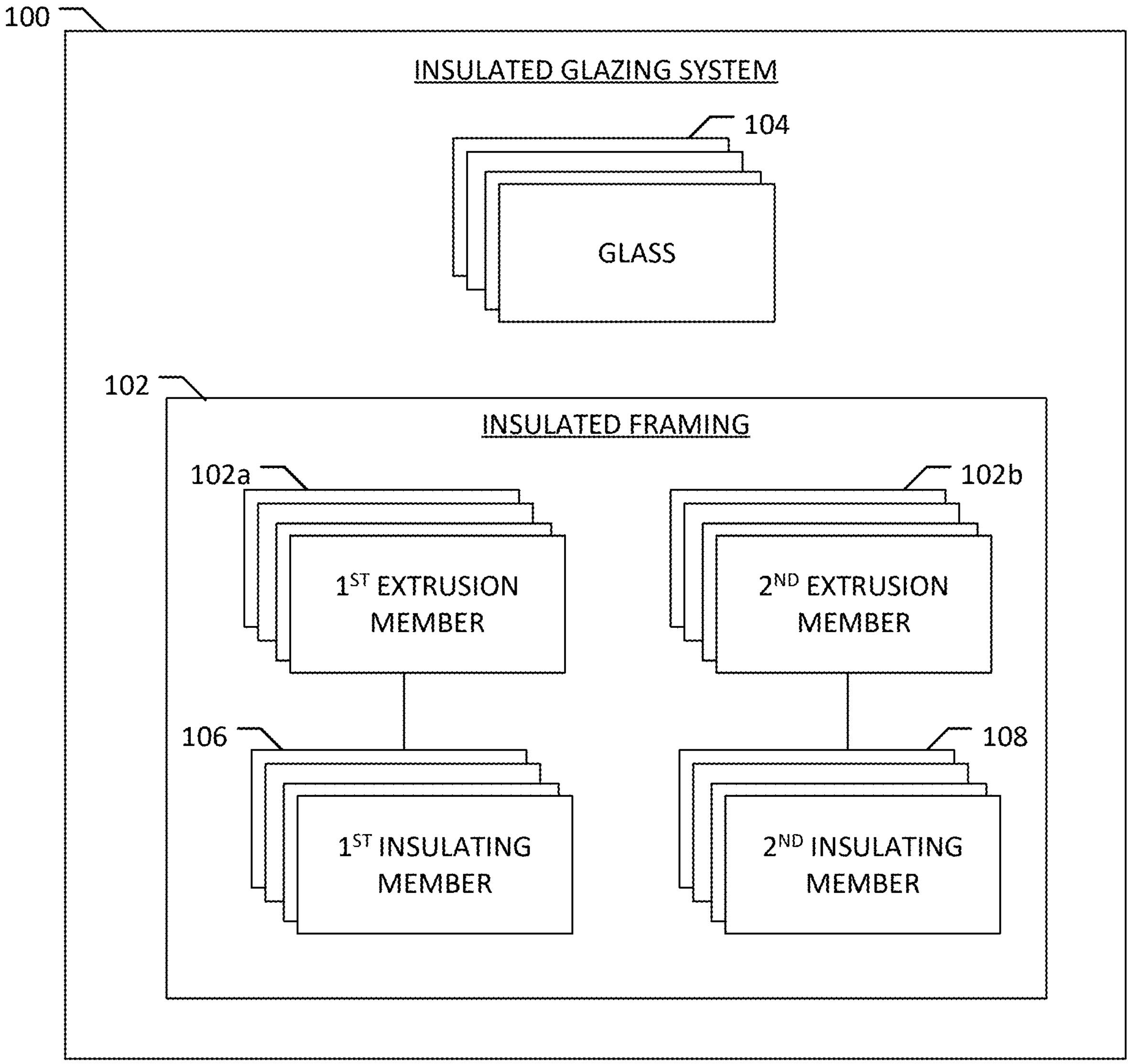
FIG. 1 is a block diagram of an insulated glazing system according to one embodiment of the present invention.

Embodiments of the present invention include an integrated backer (or insulating member) configured to provide insulation and a means for consistent sealant depth in a glazing system. The integrated backer can be made of any suitable type of foam including open cell and closed cell foams. In one embodiment, the integrated backer can be fabricated from a single piece of elongated rectangular foam of a predetermined thickness. The elongated rectangular foam can include slits that may be cut in the foam to predetermined depths in a secondary fabrication operation. In some variations, the foam can be extruded with or without the slits integrally formed therein during the extrusion process. In another variation, the integrated backer can comprise two elongated rectangular sheets of foam that are adhesively joined or thermally fused to create the integrated backer with the desired slits.

A size of the integrated backer can vary depending on the specifics of the extrusion associated with the storefront, glazing wall system, or other system. For instance, widths can vary from about 3⅞" to about 5⅜", and thickness can vary from about ⅝" to 1¼". The backer can be made in discrete lengths or in rolls wherein the desired length required is cut onsite. The integrated backer can be made from a flexible foam allowing the integrated backer to contour to most openings providing a continuous connection between an aluminum framing system and a building substrate. Typically, the integrated backer can be manufactured thicker than a typical caulk joint to allow for use in out-of-square or out-of-plumb openings. In one example, the integrated backer can be adapted to compress to less than 1⁄16" thick and can expand to 1⅛" as an opening dictates.

Embodiments of the integrated backer offer several advantages over the three-piece prior art system. Firstly, the integrated backer can be rapidly installed and positioned over the extrusion opening saving labor required to first install the prior art plastic plate and then position the foam rod in the gap between the wall and the extrusion at the desired depth. Secondly, the opening depth created by the positionally fixed integrated backer and the sides of the extrusion and building opening can be uniform along the extrusion length, allowing quicker caulk application without excessive use. Thirdly, since the integrated backer can extend wholly across the opening as a continuous piece as opposed to two small diameter foam rods, the integrated backer can provide better insulation and draft-sealing than the foam rods.

A method of implementing the integrated backer can include, but is not limited to, the following steps. First, the integrated backer can be cut to a desired length corresponding with the length of an associated extrusion. Second, slits of the integrated backer can be slid over the edges of opposing openings of the extrusion to span the gap therebetween. Third, all of the extrusions with the integrated backer installed that are part of the glazing system can be installed. As can be appreciated, the foam of the integrated backer can compress against the associated edge of the opening providing a seal between the building and the glazing system. In one instance, the ends of the integrated backer can be recessed relative to the edges of the extrusion and the edge of the opening to create an opening about 0.20"-0.70" deep. This opening is typically filled with caulk to complete the seal between the glazing system and the building opening.

In one embodiment, a method of installing an insulating member in a glazing system for a building can include, but not limited to, the following steps: (i) providing a first insulating member, (ii) implementing a first extrusion adapted for a vertically oriented jamb of the glazing system, (iii) inserting the first insulating member into a channel of the first extrusion, (iv) sliding slits of the first insulating member over opposing edges of the first extrusion, and (v) securing the first extrusion to a vertical structural member of the building with the first insulating member being located between the first extrusion and the vertical structural member. An attachment side of the first extrusion can include a channel having opposing edges. The first insulating member can be defined by a cuboidal block of material having a generally rectangular cross-section with a longitudinally-extending front side, a longitudinally-extending back side spaced from the front side a predetermined thickness, opposing longitudinally-extending left and right sides spanning between the front and back sides, a left longitudinally-extending slit projecting inwardly from the left side along a line about midway between the front and back surfaces, a right longitudinally-extending slit projecting inwardly from the right side along a line about midway between the front and back surfaces, with the slits being generally coplanar.

The method can further include providing a second insulating member. The second insulating member can be defined by a cuboidal block of material having a first layer of foam, a second layer of adhesive, and a substantially rectangular cross-section. A second extrusion can be adapted for a horizontally oriented jamb of the glazing system with the second extrusion having a solid bottom surface. The second insulating member can be attached to the solid bottom surface of the second extrusion. In one instance, the second extrusion can be secured to a horizontal structural member of the building. The second insulating member can be configured to be located between the second extrusion and the horizontal structural member when installed in the building.

Described hereinafter are example properties of one or more components of the glazing system. The first insulating member and the second insulating member can each have an R-value of approximately 3.68 per inch. The first insulating member can have a density of approximately 1.7 pounds per cubic foot (pcf). The left slit and the right slit of the first insulating member can each have a width (or depth) of approximately ⅝". The left and right sides of the first insulating member can be recessed relative to a corresponding distal edge of the first extrusion to a depth of about 0.20" to 0.70". The second insulating member can have a density of approximately 1.8 pounds per cubic foot (pcf). Caulking can be applied to a left side gap created by the first insulating member and the left distal edge of the first extrusion and to a right side gap created by the first insulating member and the right distal edge of the first extrusion. The cuboidal block of material can be a closed cell foam or an open cell foam.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

An Embodiment of an Insulated Glazing System

Referring to FIG. 1, a block diagram of an embodiment 100 of an insulated glazing system is illustrated. The insulated glazing system 100 can implement one or more insulating members as integrated backers for one or more framing components of the insulated glazing system 100. Of note, components of the insulated glazing system 100 can be implemented with currently available glazing systems. For example, the one or more insulating members can be used in conjunction with vertically and horizontally oriented extrusions in a glazing system.

As shown, the insulated glazing system 100 can include, but is not limited to, an insulated frame (or framing) 102 and a plurality of glass panes (or panels) 104. The framing 102 can typically be installed in a building or other structure typically implementing a glazing system. For example, a storefront can typically include a glazing system to implement floor to ceiling glass panes to allow for easy viewing of product in the store. The plurality of glass panes 104 can be adapted to be installed in the framing 102.

The insulated framing 102 can include, but is not limited to, a plurality of first extrusion members 102*a*, a plurality of second extrusion members 102*b*, one or more first insulating members 106, and one or more second insulating members 108. Of note, the framing 102 can include more than two extrusions that can be assembled to form the framing 102. The plurality of glass panes 104 can be installed in the framing 102 to form the insulated glazing system 100. The one or more first insulating members 106 and the one or more second insulating members 108 can be implemented to insulate the framing 102 when installed in a building (or similar). As will be described hereinafter, the insulating members 106,108 can provide several benefits over currently available means for installing glazing systems.

Typically, the framing 102 can include at least two extrusions having different cross-sectional shapes. In one example, the first extrusion 102*a* can be implemented for vertical sections of the framing 102 and the second extrusion 102*b* can be implemented for horizontal sections of the framing 102. Of note, a cross-sectional geometry of the framing extrusions can determine if the first insulating member 106 or the second insulating member 108 are to be implemented. Typically, where the extrusion includes a channel on a back of the extrusion, the first insulating member 106 can be implemented. In instances where the extrusion includes a solid back with no gaps or channels, the second insulating member 108 can be implemented.

Figure 2A:
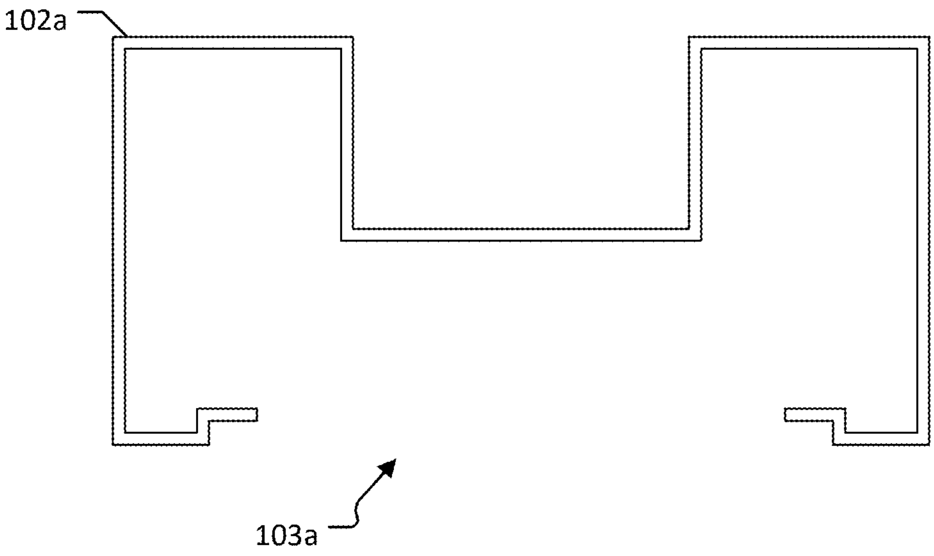
FIG. 2A is an end view of a first extrusion according to one embodiment of the present invention.
Figure 2B:
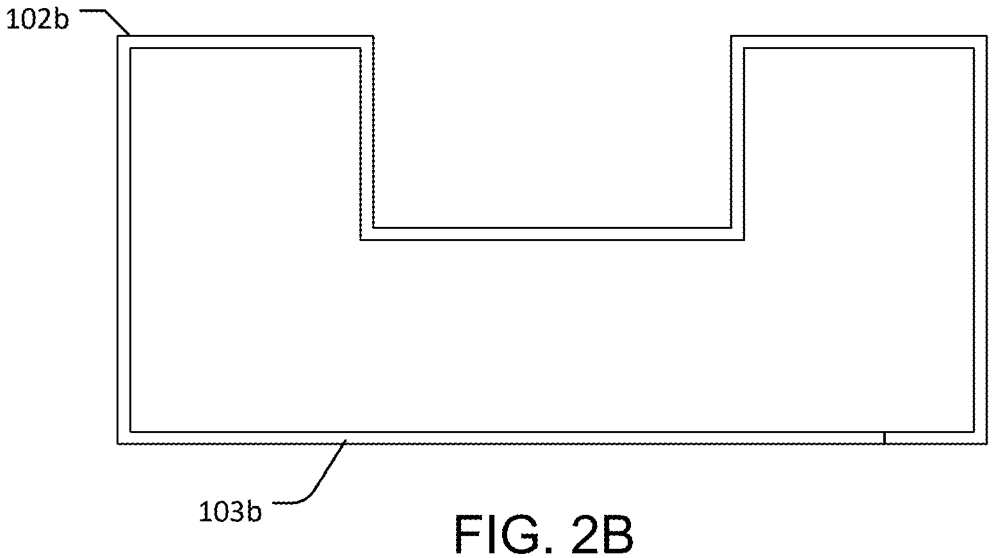
FIG. 2B is an end view of a second extrusion according to one embodiment of the present invention.

Referring to FIG. 2A, a cross-sectional view (or an end view) of one example of the first extrusion 102*a* is illustrated. Referring to FIG. 2B, a cross-sectional view (or end view) of one example of the second extrusion 102*b* is illustrated. Of note, the first extrusion 102*a* can include a channel 103*a* (or gap) on a bottom side of the first extrusion 102*a*. A top side of the first extrusion 102*a* can include a channel for receiving a portion of a window pane therein. The bottom side of the first extrusion 102*a* can be configured to be adjacent a jamb of an installation location of a building (or other structure). The second extrusion 102*b* can typically include a solid flat bottom side 103*b* spanning a width of the extrusion. The flat bottom side 103*b* can be configured to be adjacent a jamb of the installation location. Similar to the first extrusion 102*a*, a top side of the second extrusion 102*b* can include a channel for receiving a portion of a window pane therein. A width of the extrusions 102*a*, 102*b* are typically standardized depending on a glazing system being installed. It is to be appreciated that the insulating members 106, 108 can be scaled to coincide with dimensions of extrusions of a glazing system.

Figure 3A:
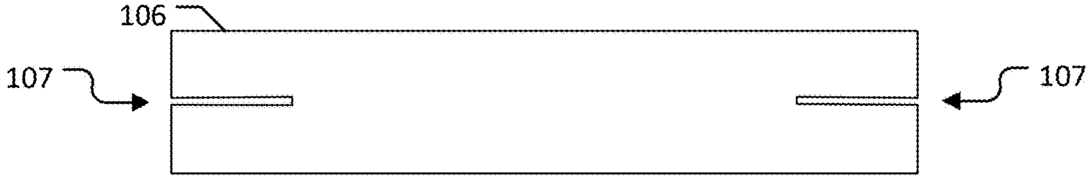
FIG. 3A is a cross-sectional view of a first insulating member according to one embodiment of the present invention.

Referring to FIG. 3A, a cross-sectional view (or end view) of the first insulating member 106 is illustrated. As shown, the first insulating member 106 can have a substantially rectangular cross-section and can include a pair of slits 107. Of note, a width of the first insulating member 106 can be adjusted based on a width of the first extrusion 102*a*. For instance, a standard extrusion for vertical jambs can typically be 4.5 inches.

Figure 3B:
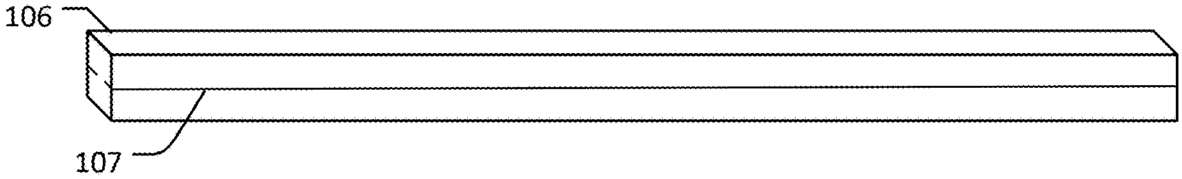
FIG. 3B is a perspective view of a first insulating member according to one embodiment of the present invention.

Referring to FIG. 3B, a perspective view of the first insulating member 106 is illustrated. As shown, the first insulating member 106 can have a substantially cuboidal shape with a rectangular cross-section. In one instance, the first insulating member 106 can be defined by a generally rectangular cross section with a longitudinally-extending front side, a longitudinally extending back side spaced from the front side a predetermined thickness, and opposing longitudinally-extending left and right sides spanning between the front and back sides. A left longitudinally-extending slit can project inwardly from the left side along a line about midway between the front and back surfaces thereof. A right longitudinally-extending slit can project inwardly from the right side along a line about midway between the front and back surfaces thereof. The slits can be generally coplanar. In another instance, the first insulating member 106 can be defined by a cuboidal block of material having (i) a generally rectangular cross-section, (ii) a left longitudinally-extending slit projecting inwardly from a left side along a line about midway between a top surface and a bottom surface, (iii) a right longitudinally-extending slit projecting inwardly from a right side along a line about midway between the top surface and the bottom surface, and (iv) the slits being generally coplanar.

The slits 107 of the first insulating member 106 can be implemented to removably couple the first insulating member 106 to an extrusion. As will be shown, the slits 107 can receive a portion of an extrusion therein to secure the first insulating member 106 to the extrusion.

Figure 3C:
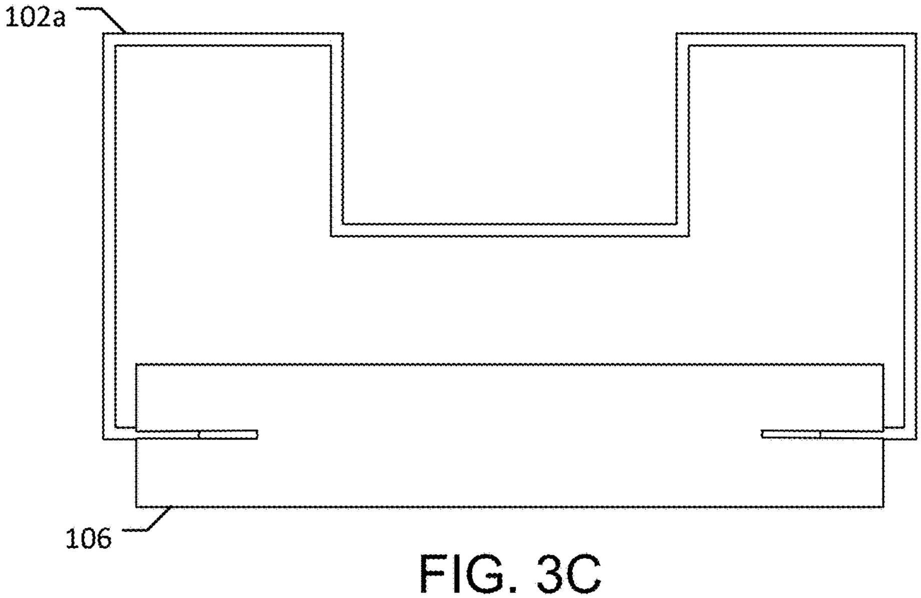
FIG. 3C is a cross-sectional (or end) view of a first insulating member and a first extrusion according to one embodiment of the present invention.

Referring to FIG. 3C, a cross-sectional view (or end view) of the first insulating member 106 inserted into the first extrusion 102*a* is illustrated. Of note, the size and shapes shown are for illustrative purposes and not meant to be limiting. The slits 107 can be slid over the interior edges in the channel 103*a* of the first extrusion 102*a*. Of significant note, the slits 107 can allow for sides of the first insulating member 106 to be approximately equidistant on either side from and exterior edge of the first extrusion 102*a* creating a channel for sealant to be applied.

Figure 4A:
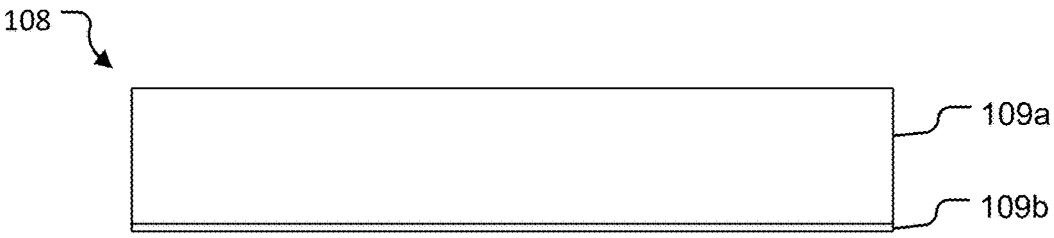
FIG. 4A is a cross-sectional view of a second insulating member according to one embodiment of the present invention.

Referring to FIG. 4A, a cross-sectional view of the second insulating member 108 is illustrated. Similar to the first insulating member 106, a cross-section of the second insulating member 108 can be substantially rectangular and can have a substantially cuboidal shape. The second insulating member 108 can include a foam layer 109*a* and an adhesive layer 109*b* for mating to the second extrusion 102*b*. The second insulating member 108 can be manufactured from a foam having insulating properties. Typically, a compressible open-cell foam can be implemented.

Figure 4B:
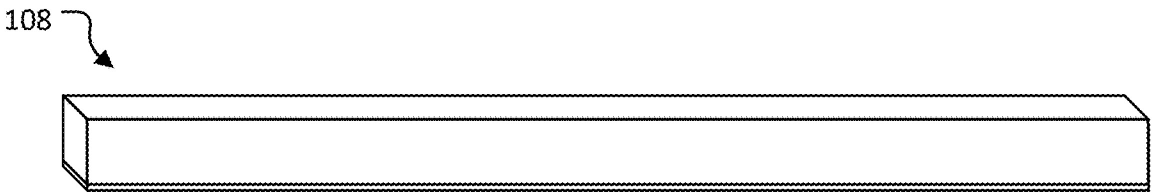
FIG. 4B is a perspective view of a second insulating member according to one embodiment of the present invention.

Referring to FIG. 4B, a perspective view of the second insulating member 108 is illustrated. As shown, the second insulating member 108 can have a substantially cuboidal shape with a rectangular cross-section. The adhesive layer 109*b* can typically span a width of the foam layer 109*a*. It is to be appreciated that embodiments are contemplated where the adhesive layer 109*b* may be narrower than the foam layer 109*a*.

Figure 4C:
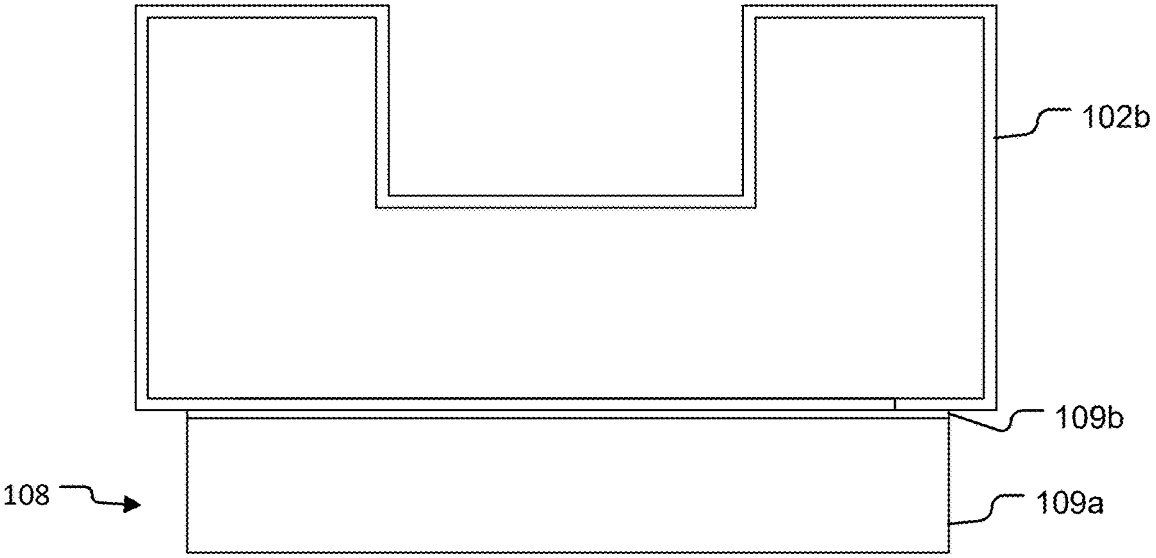
FIG. 4C is a cross-sectional (or end) view of a second insulating member and a second extrusion according to one embodiment of the present invention.

Referring to FIG. 4C, a cross-sectional view (or end view) of the second insulating member 108 interfacing with the second extrusion 102*b* is illustrated. Of note, the size and shapes shown are for illustrative purposes and not meant to be limiting. As shown, the adhesive layer 109 can interface with a bottom of the second extrusion 102*b*. Similar to the first insulating member 106, the second insulating member 108 can be sized to create a gap between an outer edge of the insulating member and an outer edge of the second extrusion 102*b*. This gap can be consistent along a length of the second extrusion 102*b* and can be filled with a sealant when the components are installed.

Included below are two tables showing example dimensions and associated properties for the first insulating member 106 and the second insulating member 108. Referring to Table 1 below, a listing of standard dimensions of the insulating members 106,108 and associated components of a glazing system are included.

TABLE 1

| Integrated Backer | Size | Slits | Adhesive | Glazing System Components |
|---|---|---|---|---|
| 1st Insulating member | 3⅞" × 1⅛" | X | | 2" × 4½" Center glazed storefront jambs |
| 1st Insulating member | 5⅜" × 1⅛" | X | | 2" × 6" Center glazed storefront jambs |
| 1st Insulating member | 5⅞" × 1⅛" | X | | 2" × 6½" Center glazed storefront jambs |
| 2nd Insulating member | 3" × 1⅛" | | X | 6" & 6¼" Curtain Wall |
| 2nd Insulating member | 4¼" × 1⅛" | | X | 4½" Storefront Head Comp & Sill Flashing |
| 2nd Insulating member | 4¼" × 1⅛" | | X | 7", 7¼", and 7½" Curtain wall |
| 2nd Insulating member | 5½" × 1⅛" | | X | 6" & 6½" Storefront Head Comp & Sill Flashing |

Referring to TABLE 2 below, a listing of R-values for the insulating members 106, 108 based on their dimensions are included. As previously mentioned, the insulating members 106,108 can have an R-value of approximately 3.68 per inch.

TABLE 2

| Integrated Backer | Size | R-Value |
|---|---|---|
| 1st Insulating Member | 3⅞" × 1⅛" | 14.26 R-Value |
| 1st Insulating Member | 5⅜" × 1⅛" | 19.78 R-Value |
| 1st Insulating Member | 5⅞" × 1⅛" | 21.62 R-Value |
| 2nd Insulating Member | 3" × 1⅛" | 11.04 R-Value |
| 2nd Insulating Member | 4¼" × 1⅛" | 15.64 R-Value |
| 2nd Insulating Member | 5½" × 1⅛" | 19.32 R-Value |

Figure 5:
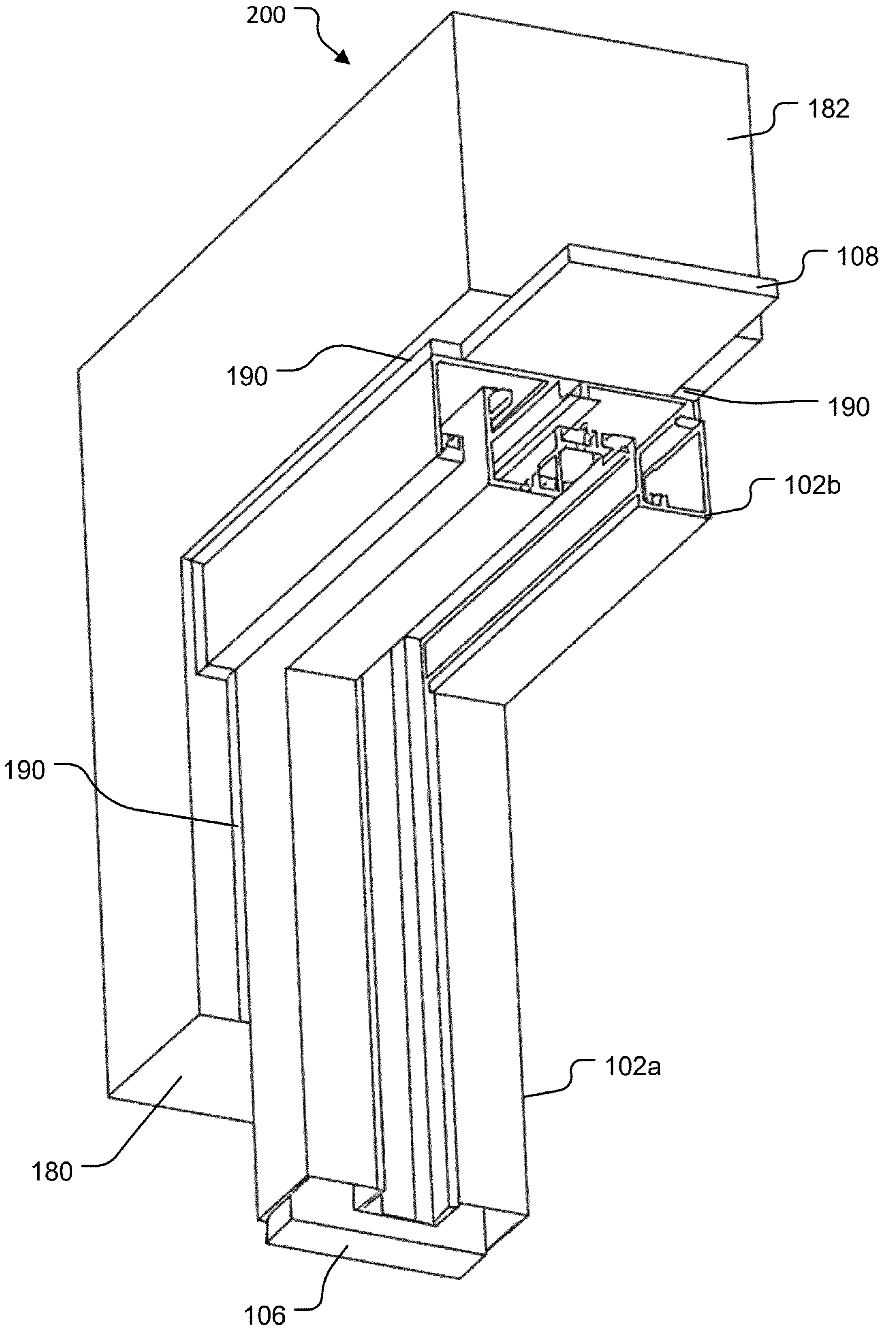
FIG. 5 is a partial perspective view of a glazing system according to one embodiment of the present invention.

Referring to FIG. 5, a partial view of installation location in a building that includes a vertical jamb 180 and a horizontal jamb 182 is illustrated. The first extrusion 102*a* can typically be used for the vertical jamb 180 and the second extrusion 102*b* can be used for the horizontal jamb 182. As previously mentioned, a gap (or channel) can be created between an edge of the insulating members 106, 108 and the extrusions 102*a*, 102*b*. The gap can be uniform along a length of the extrusions and can be used for receiving sealant 190.

Figure 6:
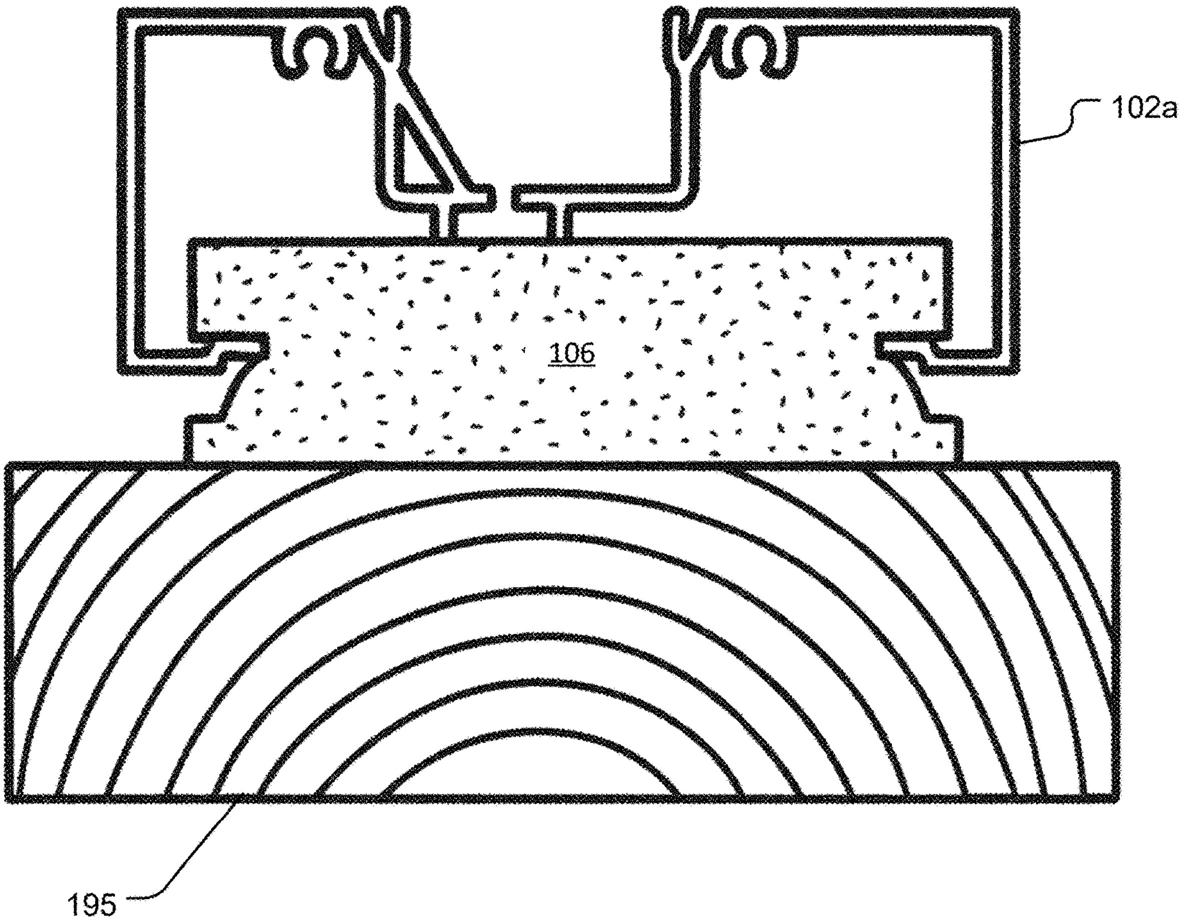
FIG. 6 is a cross-sectional view of an extrusion, an insulating member, and a substrate according to one embodiment of the present invention.

Referring to FIG. 6, a cross-sectional view of the first extrusion 102*a*, the first insulating member 106, and a substrate 195 (e.g., vertical jamb) is illustrated. As previously mentioned, the first insulating member 106 can be made from a compressible material. As such, when the first extrusion 102*a* may be coupled to the substrate 195, the first insulating member 106 can deform (e.g., compress) to keep a consistent distance between an edge of the first insulating member 106 and an outer edge of the first extrusion 102*a*.

Figure 7A:
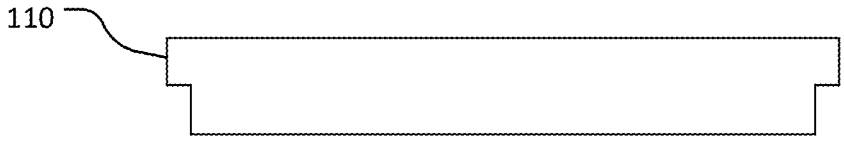
FIG. 7A is a cross-sectional view of a third insulating member according to one embodiment of the present invention.
Figure 7B:
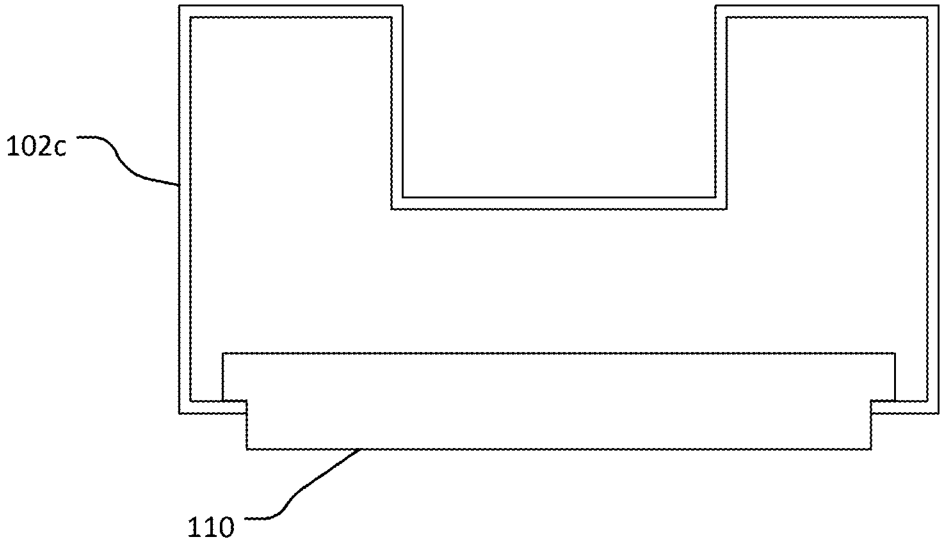
FIG. 7B is a cross-sectional (or end) view of a third insulating member and a third extrusion according to one embodiment of the present invention.

Referring to FIG. 7A, a cross-sectional (or end) view of a third insulating member 110 is illustrated. Referring to FIG. 7B, a cross-section (or end) view of the third insulating member 110 and a third extrusion 102*c* is illustrated. In some instances, the third extrusion 102*c* may be part of the insulated glazing system 100. In other instances, the third extrusion 102*c* may be a standalone extrusion for use with windows that may not be floor to ceiling. As shown, the third insulating member 110 can have a generally rectangular shape with notches on a bottom left and bottom right side. The notches can allow for the center bottom portion to extend down through an opening of the third extrusion 102*c*. The upper left and upper right side can be implemented to engage an interior of the third extrusion 102*c* keeping the third insulating member 110 in place. Similar to the previous insulating members, the third insulating member 110 can provide a gap for sealant to provide a consistent depth along a length of the third extrusion 102*c*.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A method of installing an insulating member in a glazing system for a building, the method comprising:
   - providing a first insulating member, the first insulating member being defined by:
     - a cuboidal block of material having (i) a generally rectangular cross-section with a longitudinally-extending front side, (ii) a longitudinally extending back side spaced from the front side a predetermined thickness, (iii) opposing longitudinally-extending left and right sides spanning between the front side and the back side, (iv) a left longitudinally-extending slit projecting inwardly from the left side along a line about midway between the front and back surfaces thereof, (v) a right longitudinally-extending slit projecting inwardly from the right side along a line about midway between the front and back surfaces thereof, and (vi) the slits being generally coplanar;
   - providing a first extrusion adapted for a vertically oriented jamb of the glazing system, an attachment side of the first extrusion including a channel having opposing edges;

inserting the first insulating member into the channel of the first extrusion;

sliding the slits of the first insulating member over the opposing edges of the first extrusion; and securing the first extrusion to a vertical structural member of the building with the first insulating member being located between the first extrusion and the vertical structural member.

2. The method of claim 1, further including:

providing a second insulating member, the second insulating member being defined by:

a cuboidal block of material having (i) a first layer being foam, (ii) a second layer being an adhesive, and (iii) a substantially rectangular cross-section;

providing a second extrusion adapted for a horizontally oriented jamb of the glazing system, the second extrusion having a solid bottom surface;

attaching the second insulating member to the solid bottom surface of the second extrusion; and securing the second extrusion to a horizontal structural member of the commercial storefront with the second insulating member located between the second extrusion and the horizontal structural member.

3. The method of claim 2, wherein the second insulating member has an R-value of approximately 3.68 per inch.

4. The method of claim 1, wherein the first insulating member has a density of approximately 1.7 pcf.

5. The method of claim 1, wherein the left slit and the right slit each have a width of approximately ⅝".

6. The method of claim 1, wherein the left side and the right side of the first insulating member are each recessed relative to a corresponding distal edge of the first extrusion to a depth of about 0.20" to 0.70".

7. The method of claim 6, further including:

applying caulking to a left side gap created by the first insulating member and a left distal edge of the first extrusion; and applying caulking to a right side gap created by the first insulating member and a right distal edge of the first extrusion.

8. The method of claim 1, wherein the first insulating member has an R-value of approximately 3.68 per inch.

9. The method of claim 1, wherein the first insulating member is a closed cell foam.

10. The method of claim 1, wherein the first insulating member is an open cell foam.

11. A method of installing an insulating member in a glazing system for a building, the method comprising:

providing a first insulating member, the first insulating member being defined by:

a cuboidal block of material having (i) a generally rectangular cross-section, (ii) a left longitudinally-extending slit projecting inwardly from a left side along a line about midway between a top surface and a bottom surface, (iii) a right longitudinally-extending slit projecting inwardly from a right side along a line about midway between the top surface and the bottom surface, and (iv) the slits being generally coplanar;

providing a first extrusion adapted for a vertically oriented jamb of the glazing system, an attachment side of the first extrusion including a channel having opposing edges;

inserting the first insulating member into the channel of the first extrusion and sliding the slits of the first insulating member over the opposing edges of the first extrusion; and securing the first extrusion to a vertical structural member of the building with the first insulating member being located between the attachment side of the first extrusion and the vertical structural member.

12. The method of claim 11, wherein the first insulating member is adapted to create a substantially uniform caulking depth on either side of the first insulating member when installed in the first extrusion.

13. The method of claim 11, wherein a width of the first insulating member is less than a width of the first extrusion.

14. The method of claim 13, wherein a width of the first insulating member is greater than a width of the channel of the first extrusion.

15. The method of claim 11, further including:

providing a second insulating member, the second insulating member being defined by:

a cuboidal block of material having (i) a first layer being foam, (ii) a second layer being an adhesive, and (iii) a substantially rectangular cross-section;

providing a second extrusion adapted for a horizontally oriented jamb of the glazing system, the second extrusion having a solid bottom surface;

attaching the second insulating member to the solid bottom surface of the second extrusion; and securing the second extrusion to a horizontal structural member of the building with the second insulating member located between the second extrusion and the horizontal structural member.

16. The method of claim 11, wherein a distance from an outermost edge of the first insulating member to an outermost edge of the first extrusion is between 0.20 inches to 0.70 inches.

17. The method of claim 11, wherein the first insulating member is manufactured from two pieces of foam adhesively coupled together.

18. The method of claim 11, wherein the first insulating member is a single piece of elongated rectangular foam of a predetermined thickness where the slits are cut in the foam to a predetermined depth.

19. The method of claim 11, wherein the first insulating member spans an entirety of the channel when inserted into the first extrusion.

20. A method of installing an insulating member in a glazing system for a building, the method comprising:

providing an insulating member, the insulating member consisting essentially of:

a cuboidal block of material having (i) a generally rectangular cross-section, (ii) a left longitudinally-extending slit projecting inwardly from a left side along a line about midway between a top surface and a bottom surface, (iii) a right longitudinally-extending slit projecting inwardly from a right side along a line about midway between the top surface and the bottom surface, and (iv) the slits being generally coplanar;

providing a first set of extrusions adapted for vertical jambs of the glazing system, an attachment side of each of the first set of extrusions including a channel having opposing edges;

inserting a predetermined length of the insulating member into the channel of each of the first set of extrusions, the slits of the first insulating member being slid over the opposing edges; and securing the first set of extrusions to vertical structural members of the building with the insulating member being located between the first set of extrusions and the vertical structural members.

* * * * *